United States Patent
Schafer et al.

(10) Patent No.: US 9,786,069 B2
(45) Date of Patent: Oct. 10, 2017

(54) REFINED RECONSTRUCTION OF TIME-VARYING DATA

(71) Applicant: Siemens Healthcare GmbH, Erlangen (DE)

(72) Inventors: Sebastian Schafer, Madison, WI (US); Markus Kowarschik, Erlangen (DE); Sonja Gehrisch, Saalburg-Ebersdorf (DE); Kevin Royalty, Fitchburg, WA (US); Christopher Rohkohl, Hattingen (DE)

(73) Assignee: Siemens Healthcare GmbH (DE)

(*) Notice: Subject to any disclaimer, the term of this patent is extended or adjusted under 35 U.S.C. 154(b) by 3 days.

(21) Appl. No.: 15/063,361

(22) Filed: Mar. 7, 2016

(65) Prior Publication Data
US 2017/0256077 A1 Sep. 7, 2017

(51) Int. Cl.
*G06K 9/00* (2006.01)
*G06T 11/00* (2006.01)

(52) U.S. Cl.
CPC .......... *G06T 11/008* (2013.01); *G06T 11/006* (2013.01); *G06T 2211/404* (2013.01); *G06T 2211/421* (2013.01)

(58) Field of Classification Search
CPC ....... A61B 6/4441; A61B 6/481; A61B 6/504; A61B 6/487; G06T 2211/404; G06T 2211/436; G06T 15/08; G06T 2207/20182
See application file for complete search history.

(56) References Cited

U.S. PATENT DOCUMENTS

| | | | |
|---|---|---|---|
| 5,881,728 A * | 3/1999 | Mistretta | G01R 33/561 324/307 |
| 8,620,404 B2 | 12/2013 | Mistretta | |
| 8,643,642 B2 | 2/2014 | Mistretta | |
| 8,654,119 B2 | 2/2014 | Mistretta et al. | |
| 8,823,704 B2 | 9/2014 | Mistretta | |
| 8,830,234 B2 | 9/2014 | Mistretta et al. | |
| 8,957,894 B2 | 2/2015 | Mistretta et al. | |

(Continued)

FOREIGN PATENT DOCUMENTS

WO PCT/EP2015/079102 12/2015

OTHER PUBLICATIONS

Tang, et al., "New Consistency Theorem of Motion Contaminated Projection Data and Applications in Motion Artifacts Correction", Medical Imaging 2012: Physics of Medical Imaging, Proc. of SPIE vol. 8313, 83131E, 2012, 8 pgs.

(Continued)

*Primary Examiner* — Bhavesh Mehta
*Assistant Examiner* — Ian Lemieux

(57) ABSTRACT

Systems and methods are provided for refined data reconstruction. In accordance with one aspect, the framework performs a first four-dimensional reconstruction of time-varying data to generate a four-dimensional Digital Subtraction Angiography (DSA) dataset of an object of interest. The framework extracts a volume of interest from the four-dimensional DSA dataset to generate a volume array. The volume of interest may be refined based on the volume array to generate a refined dataset. A second four-dimensional reconstruction may then be performed based on the refined dataset to generate a zoomed-in four-dimensional representation of the volume of interest.

20 Claims, 5 Drawing Sheets

(56) References Cited

U.S. PATENT DOCUMENTS

| | | | |
|---|---|---|---|
| 8,963,919 B2 | 2/2015 | Mistretta | |
| 2013/0046176 A1 | 2/2013 | Mistretta et al. | |
| 2014/0056496 A1* | 2/2014 | Kwak | A61B 5/0263 |
| | | | 382/131 |
| 2014/0316758 A1* | 10/2014 | Yagi | A61B 5/055 |
| | | | 703/9 |
| 2014/0376791 A1 | 12/2014 | Endres et al. | |
| 2015/0173699 A1* | 6/2015 | Kyriakou | A61B 6/466 |
| | | | 378/62 |
| 2015/0248757 A1* | 9/2015 | Ohishi | G06T 5/002 |
| | | | 382/131 |
| 2015/0363941 A1* | 12/2015 | Taylor | A61B 5/02007 |
| | | | 345/441 |
| 2016/0005192 A1* | 1/2016 | Royalty | G06T 11/003 |
| | | | 382/131 |
| 2016/0048959 A1* | 2/2016 | Kowarschik | G06T 7/0012 |
| | | | 600/425 |

OTHER PUBLICATIONS

A. D. Copeland, et al, "Spatio-Temporal Data Fusion for 3D+T Image Reconstruction in Cerebral Angiography," Medical Imaging, IEEE Transactions on, vol. 29, No. 6, pp. 1238-1251, 2010.

C.A. Mistretta, "Sub-Nyquist acquisition and constrained reconstruction in time resolved angiography," Medical Physics, vol. 38, No. 6, pp. 2975-2985, 2011.

I. Waechter, et al., "Model-based blood flow quantification from rotational angiography," Medical Image Analysis, vol. 12, pp. 586-602, 2008.

* cited by examiner

REFINED RECONSTRUCTION OF TIME-VARYING DATA

TECHNICAL FIELD

The present disclosure generally relates to image data processing, and more particularly to refined reconstruction of time-varying data.

BACKGROUND

Angiography is a common method used to represent blood vessels based on diagnostic imaging methods, such as X-ray or Magnetic Resonance Tomography (MRT). For an improved representation of the vessels under examination, Digital Subtraction Angiography (DSA) has been developed. DSA is a fluoroscopy technique used in interventional radiology to clearly visualize blood vessels in a bony or dense soft tissue environment. Images are produced by subtracting a 'pre-contrast image' or the mask from subsequent images acquired after the contrast medium has been introduced into a structure or tissue of interest. These images can be used to provide time-resolved or time-varying information that shows the development of the structure or tissue of interest over time.

In current clinical practice, time-resolved information is generally only available in two dimensions. Typically, the surgeon has to perform a two-dimensional (2D) to three-dimensional (3D) mental conversion from the 2D projection images to 3D anatomy in order to assess and diagnose vascular pathologies and blood flow abnormalities. The filling of the vasculature changes from frame to frame, leaving the surgeon with the difficult task of interpreting 3D filling from varying 2D snapshots. Regardless of acquisition/viewing angle, vessel segments that are overlapping and/or obscured may therefore be compromised, leading to potentially missing image information or incorrect diagnosis. Problems include, for example, vessel overlap or vessels running orthogonal to the detector plane.

Vascular filling may be visualized using single-plane or bi-plane 2D DSA image(s). Existing methods may provide acceptable results, but struggle with complex vasculature and occluded vessels, introduction of premature vessel filling, and fluctuations in vessel filling. Some traditional techniques use data from static angles instead of the acquisition sequences themselves, which can lead to additional radiation exposure for the patient as well as inaccuracies arising from a corresponding need for highly accurate image registration steps. Other methods are based on simplifying assumptions (i.e., simplified models) concerning the patient's physiology (e.g., periodic cardiac activity) as well as the transport of blood, and mixture of blood and contrast agent, through the patient's vasculature. These may lead to reconstructed flow results that deviate from real flow patterns.

Recent years have seen the introduction of methodologies for non-time-resolved 3D-DSA. In one method, a mask projection image sequence is first acquired during a rotational scan of the angiographic device, followed by a sequence of rotational fill projection images acquired after the introduction of contrast agent. The mask projection images are subtracted from the fill projection images to generate projection image data that displays a subject's vascular anatomy acquired at different viewing angles. Using 3D reconstruction techniques, a static volumetric dataset of a subject's vasculature can be created. This static reconstruction does not, however, include the change recorded in the acquisition temporal sequence.

SUMMARY

Described herein are systems and methods for refined data reconstruction. In accordance with one aspect, the framework performs a first four-dimensional reconstruction of time-varying data to generate a four-dimensional Digital Subtraction Angiography (DSA) dataset of an object of interest. The framework extracts a volume of interest from the four-dimensional DSA dataset to generate a volume array. The volume of interest may be refined based on the volume array to generate a refined dataset. A second four-dimensional reconstruction may then be performed based on the refined dataset to generate a zoomed-in four-dimensional representation of the volume of interest.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
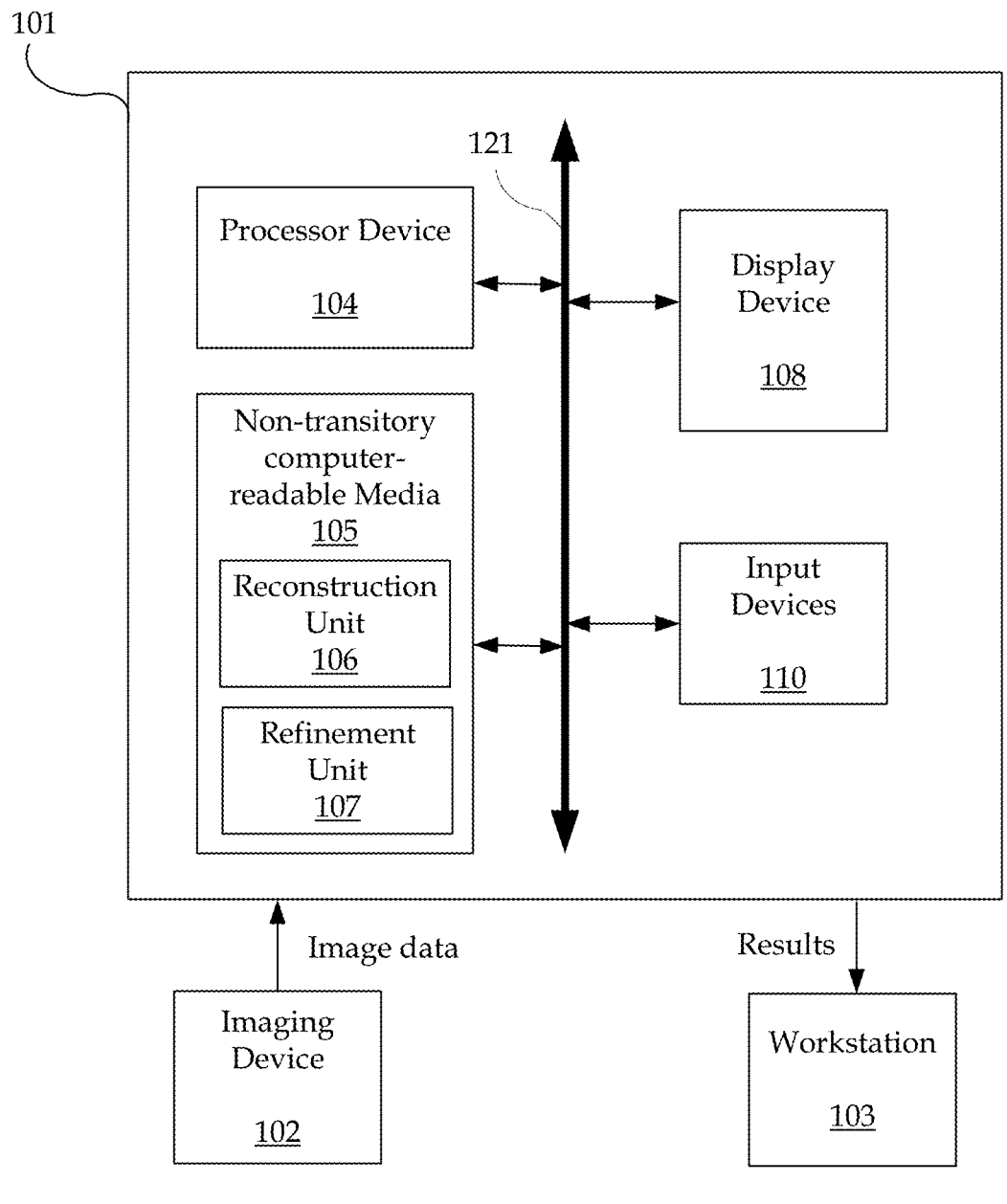
FIG. 1 is a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the concept to the particular forms disclosed, but on the contrary, the intention is to cover all modifications, equivalents, and alternatives falling within the spirit and scope of the concept. Furthermore, for ease of understanding, certain method steps are delineated as separate steps; however, these separately delineated steps should not be construed as necessarily order dependent in their performance.

The term "X-ray image" as used herein may mean a visible X-ray image (e.g., displayed on a video screen) or a digital representation of an X-ray image (e.g., a file corresponding to the pixel output of an X-ray detector). The term "in-treatment X-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to X-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images, voxels for 3D images, doxels for 4D datasets). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture, 3D volume or 4D dataset. For a 2- or 3-Dimensional image, the domain of the image is typically a 2- or 3-Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, "voxels" for volume image elements, often used with respect to 3D imaging, and "doxels" for 4D datasets can be used interchangeably. It should be noted that the 3D volume image is itself synthesized from image data obtained as pixels on a 2D sensor array and displays as a 2D image from some angle of view. Thus, 2D image processing and image analysis techniques can be applied to the 3D volume image data. In the description that follows, techniques described as operating upon doxels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel", "subject voxel" and "subject doxel" are used to indicate a particular image element as it is operated upon using techniques described herein.

One aspect of the present framework facilitates interrogation of a four-dimensional (4D) Digital Subtraction Angiography (DSA) dataset. A 4D dataset generally refers to a time-resolved three-dimensional (3D) dataset. The 4D DSA dataset may be derived from a pair of rotational acquisitions: a rotational mask run that generates mask projection image data followed by a rotational contrast-enhanced fill run that generates fill projection image data. The temporal dynamics contained in the projection image data may be functionally encoded into static 3D-DSA constraining image data to generate the 4D-DSA dataset.

Current techniques only reconstruct 4D-DSA datasets based on the fully acquired field of view (FOV). The present framework advantageously enables the user to refine a reconstruction of a 4D-DSA dataset by, for example, zooming in and/or cropping a volume of interest. A dedicated re-reconstruction of the 4D-DSA dataset may then be performed on the volume of interest. The volume of interest may be refined by, for example, increasing the spatial resolution relative to the regions outside the volume of interest or altering the vascular information outside the volume of interest. The accuracy of the reconstructed series of time-resolved volumes for a volume of interest can therefore be significantly improved, enabling more detailed qualitative and quantitative analysis of the underlying hemodynamics in the reconstruction.

The refined 4D-DSA datasets reconstructed by the present framework may be used to, for instance, evaluate risks prior to neurovascular interventions. Neurovascular interventions commonly involve the placement of flow diverting devices to cover aneurysms, and to induce thrombolysis and subsequent healing of the aneurysm. These flow diverting stents can substantially alter the flow dynamics in the vasculature upstream from the aneurysm, creating potentially dangerous scenarios. Misplaced stents ending in a vessel wall or with a highly reduced diameter (nozzle effect) can increase the risk of a new aneurysm creation or vessel dissection. Evaluating these risks prior to intervention can advantageously mitigate the risks of such procedures. It is understood that while a particular application directed to vascular network visualization may be shown, the technology is not limited to the specific implementations illustrated.

FIG. 1 is a block diagram illustrating an exemplary system 100. The system 100 includes a computer system 101 for implementing the framework as described herein. Computer system 101 may be a desktop personal computer, a portable laptop computer, another portable device, a minicomputer, a mainframe computer, a server, a cloud infrastructure, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server, such as syngo®.via by Siemens Healthcare), a client user machine in server-client user network environment, or as a peer machine in a peer-to-peer (or distributed) network environment.

Computer system 101 may include a processor device or central processing unit (CPU) 104 coupled to one or more non-transitory computer-readable media 105 (e.g., computer storage or memory), display device 108 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 105. In particular, the present techniques may be implemented by a reconstruction unit 106 and a refinement unit 107. Non-transitory computer-readable media 105 may include random access memory (RAM), read-only memory (ROM), magnetic floppy disk, flash memory, and other types of memories, or a combination thereof. The computer-readable program code is executed by processor device 104 to process images or image data acquired by, for example, imaging device 102. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing image datasets, dynamic reconstruction instructions, knowledge base, and so forth. Such data may also be stored in external storage or other memories. The external storage may be implemented using a database management system (DBMS) managed by the processor device 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 102 may be a radiology scanner, such as an X-ray or a CT scanner, for acquiring image data. The workstation 103 may include a computer and appropriate peripherals, such as a keyboard and display device, and can be operated in conjunction with the entire system 100. For example, the workstation 103 may communicate with the imaging device 102 so that the image data collected by the imaging device 102 can be rendered at the workstation 103 and viewed on a display device.

The workstation 103 may communicate directly with the computer system 101 to display processed image data and/or output image processing results (e.g., 4D DSA dataset). The workstation 103 may include a graphical user interface to receive user input via an input device (e.g., keyboard, mouse, touch screen, voice or video recognition interface, etc.) to manipulate visualization and/or processing of the image data. For example, the user may view the processed image data, and specify one or more view adjustments or preferences (e.g., zooming, cropping, panning, rotating, changing contrast, changing color, changing view angle, changing view depth, changing rendering or reconstruction technique, etc.), navigate to a particular region of interest by specifying a "goto" location, navigate (e.g., stop, play, step through, etc.) temporal volumes of the reconstructed 4D dataset, and so forth.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
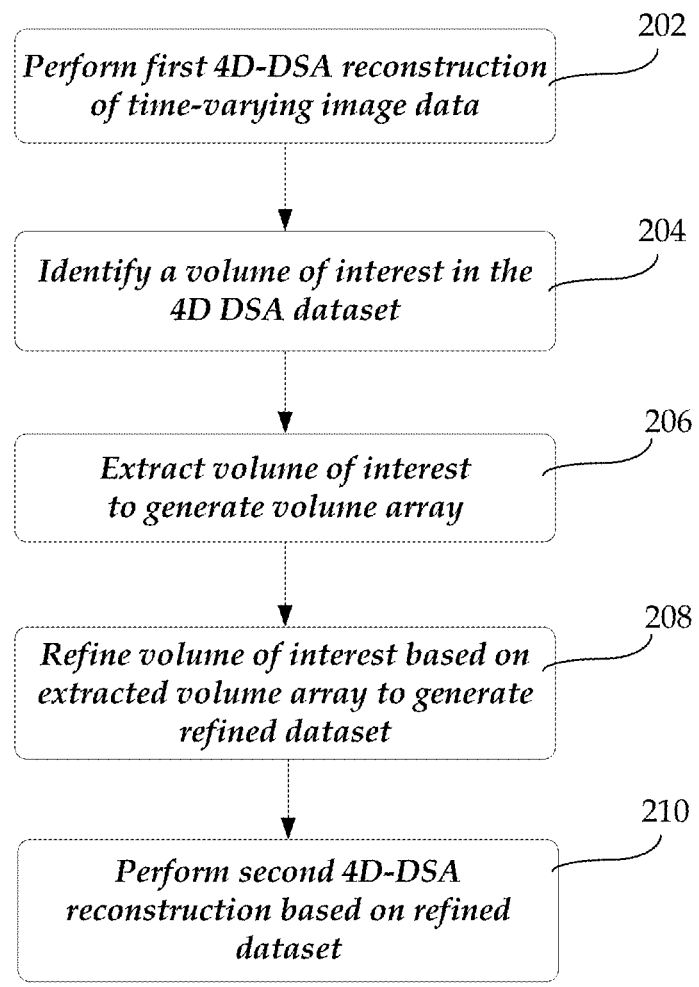
FIG. 2 shows an exemplary method of data reconstruction performed by a computer system.

FIG. 2 shows an exemplary method 200 of data reconstruction performed by a computer system. It should be understood that the steps of the method 200 may be performed in the order shown or a different order. Additional, different, or fewer steps may also be provided. Further, the method 200 may be implemented with the system 101 of FIG. 1, a different system, or a combination thereof.

At 202, reconstruction unit 106 performs a first 4D reconstruction of time-varying image data to generate a 4D (or time-varying 3D) DSA projection image dataset V(t) of an object of interest. Each doxel of the 4D DSA projection image dataset V(t) represents the injected contrast flow in the vasculature of the object of interest at a particular three-dimensional location and at a particular time. The object of interest may be any biological object identified for investigation or examination, such as a portion of a patient's or subject's brain, heart, leg, arm, and so forth. The object of interest includes one or more vessel-like structures (e.g., blood vessels, arteries, vascular tree or network, etc.). The one or more vessel-like structures may be dynamic or time-varying structures that can be filled with a contrast agent or medium for observing its propagation over time. In some implementations, a static (i.e., non-temporal) 3D image data of a device (e.g., flow diverting device) implanted in the object of interest is also reconstructed.

The time-varying data may be a set of 2D DSA projection images that are acquired by performing a rotational scan or angular acquisitions using imaging device 102. A single mask and fill acquisition may be performed via the imaging device 102. More particularly, a mask image dataset may first be acquired via the imaging device 102 such that it can be subtracted from the corresponding time-varying contrast filled projection image dataset. A mask image is simply an image of the same area before the contrast agent (or medium) is administered to fill the vessel-like structures of the irradiated object of interest that is to be investigated. The actual angular- and time-varying 2D projection data may be based on a contrast enhanced acquisition that is initiated before or after the injection of X-ray contrast medium into the vessel-like structures as the first inflow of contrast becomes visible. Both mask and fill runs may follow the same acquisition trajectory. The trajectory may cover the entire field-of-view (FOV) range of a 3D DSA.

Imaging device 102 may be a scanner or C-arm system with a single imaging plane or multiple imaging planes. For example, imaging device 102 may be a flat-panel based X-ray scanner that includes at least one pair of X-ray source and X-ray detector. Alternatively, imaging device 102 may include a rotating CT gantry covering at least one pair of X-ray source and X-ray detector. In other implementations, imaging device 102 is an MR projection scanner. In yet other implementations, imaging device 102 is a rotating optical CT gantry covering at least one pair of light source and optical detector. Other types of imaging device 102, such as angular sampling ultrasound, may also be used.

Figure 3:
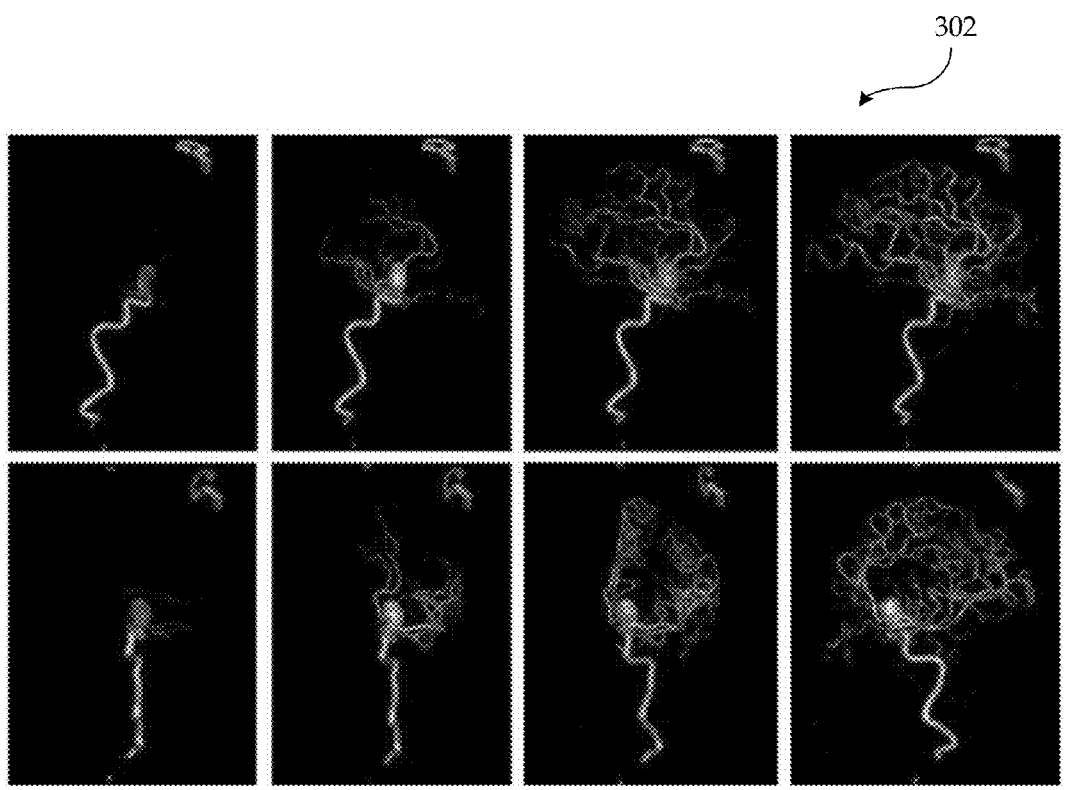
FIG. 3 shows a time series of 3D angiographic images of a patient's brain that were reconstructed using a single rotating plane.

FIG. 3 shows a time series of 3D angiographic images 302 of a patient's brain that were reconstructed using a single rotating imaging plane. Methods for performing a 4D-DSA reconstruction of time-varying image data acquired by a single rotating plane C-arm system are described in application Ser. No. 14/302,596 filed on Jun. 12, 2014 (now U.S. Pub. No. 2014/0376791), which is hereby incorporated by reference. These methods may determine time-varying volumetric attenuation curves of the vessel-like structures of interest, resulting in a 3D plus time (or 4D-DSA) volumetric dataset that includes the time dimension. The 4D-DSA dataset may also be derived from time- and projection angle-varying data. Confidence values or curves may be used in performing interpolation of time-resolved 3D DSA. Such framework may be applied once, or in an iterative fashion. The 4D-DSA dataset may also be dynamically and iteratively reconstructed based on, for example, an initial time-varying 3D projection dataset derived from time-varying 2D projection data acquired at multiple angles.

Methods for performing a 4D-DSA reconstruction of time-varying image data acquired by a dual C-arm system are described in German application no. 102015224176.9 filed on Dec. 3, 2015 entitled "Tomography system and method for generating a sequence of volume images of a vasculature" (also PCT application no. PCT/EP2015/079102 filed on Dec. 9, 2015), which are hereby incorporated by reference. These techniques are based on an angiographic biplane system that comprises two simultaneously rotating planes. The accuracy of the reconstructed series of time-resolved volumes can be significantly improved, since information from the two planes can be exploited to mitigate accuracy issues due to vascular overlap.

Figure 4:
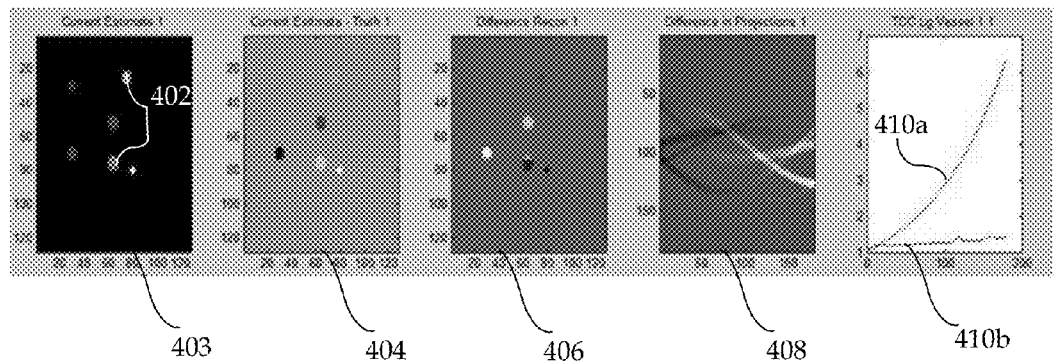
FIG. 4 illustrates an initial estimate of an exemplary 4D-DSA reconstruction.

FIG. 4 illustrates an initial estimate of an exemplary 4D-DSA reconstruction in a simulation study. The initial estimate includes all vessels 402. Image 403 shows a current estimate of the 4D-DSA reconstruction. Image 404 shows the difference between the known ground truth and the current estimate of the 4D-DSA reconstruction. Image 406 shows a reconstruction of the error between the projection of the current estimate and the original projection information. Image 408 shows a sinogram of the error/difference in projection images. Time curves 410a-b are taken from the center vessel, wherein curve 410a represents the ground truth and curve 410b represents the current estimate. It can be observed that the error between the ground truth and the estimate is very high.

Figure 5:
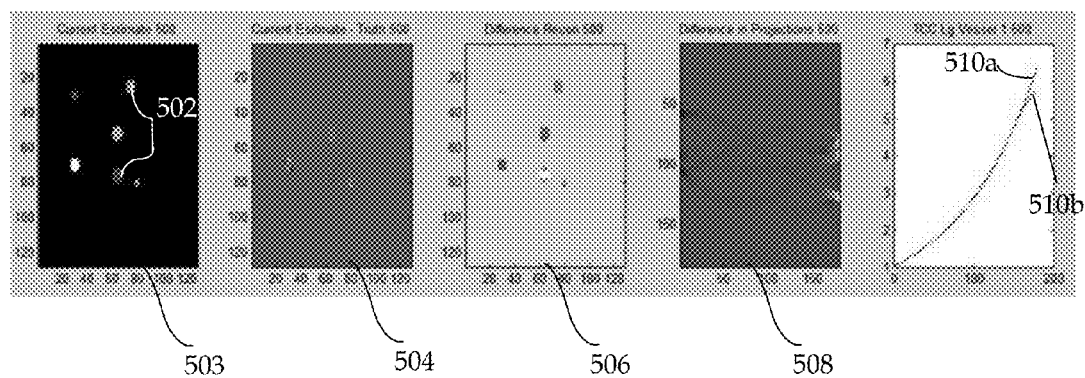
FIG. 5 shows a final estimate of the exemplary 4D-DSA reconstruction.

FIG. 5 shows a final estimate of the exemplary 4D-DSA reconstruction in the simulation study. Image 503 shows the current estimate of the 4D-DSA reconstruction, which includes all vessels 502. Image 504 shows the difference between the known ground truth and the current estimate of the 4D-DSA reconstruction. Image 506 shows the reconstruction of the error between the projection of the current estimate and the original projection information. Image 508 shows the sinogram of the error/difference in projection images. Time curves 510a-b are taken from the center vessel, wherein curve 510a represents the ground truth and curve 510b represents the current estimate. It can be observed that the error between the ground truth and the estimate of the 4D-DSA reconstruction has been minimized.

Returning to FIG. 2, at 204, refinement unit 107 identifies a volume of interest (VOI) in the resulting 4D DSA dataset generated by reconstruction unit 106. The volume of interest is any sub-region of any shape (e.g., cubic) of the entire 4D DSA dataset that is identified for further study. The VOI may be manually, automatically or semi-automatically identified. For example, the VOI may be identified by receiving a user selection from a user interface implemented on workstation 103, including coordinates of points defining the volume of interest. Reconstruction unit 106 may initiate a volumetric rendering of the 4D DSA dataset that is presented to the user via, for example, a user interface implemented on workstation 103. The time component may be displayed as, for example, a color rendering or time-steps generated during interaction. In some implementations, a rendering of the static 3D image data of the implanted device is also presented with the 4D DSA data via the user interface.

The user interface may provide various user interface elements (e.g., buttons, text functions) to enable the user to select, zoom in and/or crop the volume of interest in the 4D DSA dataset. The user interface may further provide a user interface element to enable the user to initiate refinement of the volume of interest. Upon initiation of the refinement process, the workstation 103 may transmit the coordinates of the volume of interest to the refinement unit 107.

At 206, refinement unit 107 extracts the volume of interest (VOI) from the 4D angiographic image data V(t) to generate a volume array $V(t)_c$. The extraction may be performed by, for example, subtracting the VOI from V(t).

At 208, refinement unit 107 refines the volume of interest (VOI) based on the volume array $V(t)_c$ to generate a new refined dataset. In some implementations, the VOI is refined by removing vascular data in the regions outside the volume of interest. This may be achieved by forward projecting $(A[V(t)_c]=p(t)_c)$ the volume array $V(t)_c$ into the corresponding projection image (or imaging plane) p(t) to generate an intermediate projection dataset $p(t)_c$, and subtracting the intermediate projection dataset $p(t)_c$ from the projection image p(t) to generate a new refined projection dataset $p(t)_{VOI}$. The new refined projection dataset $p(t)_{VOI}$ is a 2D image array containing only vascular data in the VOI.

Alternatively, the VOI is refined by changing the spatial resolution settings within the volume array $V(t)_c$ and/or outside the volume array $V(t)_c$ such that the volume array $V(t)_c$ has a higher spatial resolution relative to the regions outside the volume array $V(t)_c$. In some implementations, a new refined dataset $V(t)_{spatial}$ is created, having a lower resolution outside the volume of interest (relatively lower than the initial reconstruction) and a very high spatial resolution inside the volume of interest (relatively higher than the initial reconstruction). The new refined dataset $V(t)_{spatial}$ may be created by reconstructing the volume array $V(t)_c$ from the refined projection dataset $p(t)_{VOI}$ at a relatively smaller voxel size and reconstructing another volume array at a relatively larger voxel size using conventional 4D DSA. The two volume arrays may then be merged, resulting in a refined dataset $V(t)_{spatial}$ with a higher spatial resolution in the VOI and a lower spatial resolution outside the VOI.

In other implementations, the VOI is refined based on the principles of filtered backprojection (FBP). Recent research has proven that a duly sampled 3D dataset reconstructed with FBP contains all temporal dynamics in the images. See, for example, Tang, Jie, et al., "New consistency theorem of motion contaminated projection data and applications in motion artifacts correction," *SPIE Medical Imaging. International Society for Optics and Photonics,* 2012, which is hereby incorporated by reference. To illustrate, when forward projecting through a 3D volume into the acquired projection angles, the same image will be created giving the same temporal dynamics. This can be visualized as follows: a rotational x-ray sequence of a glass being filled from empty to full is acquired and reconstructed using FBP. The averaging effect of FBP will present a half-full glass. If forward projections are generated through the 3D volume, they will represent the correct fill status of the glass at the time of the projection image acquisition.

The VOI may be refined by removing the defined volume array $V(t)_c$ from a static 3D volume $S(t)$ reconstructed by filtered backprojection (FBP) to generate a cropped static volume array $S(t)_c$. The cropped static volume array $S(t)_c$ may then be forward projected $(A[S(t)_c]=s(t)_c)$ into the corresponding projection image (p(t)) to generate an intermediate projection dataset $s(t)_c$. A new refined dataset $s(t)_{VOI}$ is created by subtracting the intermediate projection dataset $s(t)_c$ from projection image p(t). This new refined dataset $s(t)_{VOI}$ is a 2D array containing only the vascular data in the VOI.

Figure 6:
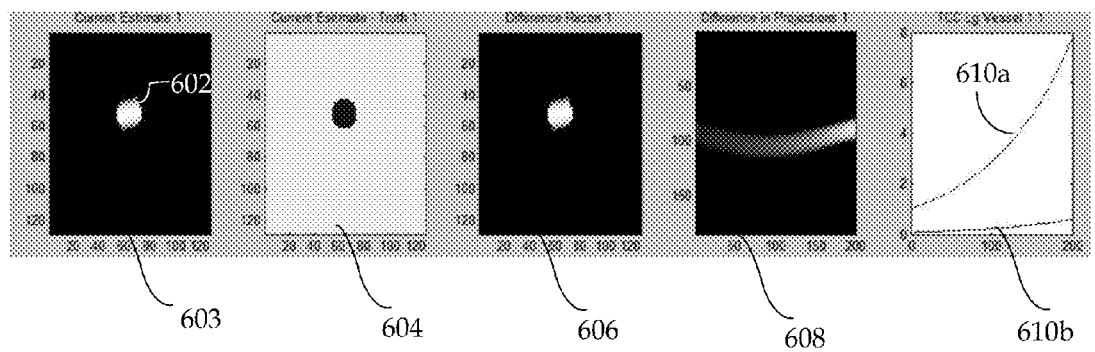
FIG. 6 illustrates an initial estimate of an exemplary refined 4D-DSA reconstruction of the center vessel.

FIG. 6 illustrates an initial estimate of an exemplary refined 4D-DSA reconstruction of the center vessel 602. The initial estimate of the 4D-DSA reconstruction includes only the volume of interest. Image 603 shows the current estimate of the 4D-DSA vessel of interest reconstruction. Image 604 shows the difference between the known ground truth and the current estimate of the 4D-DSA reconstruction. Image 606 shows the reconstruction of the error between the projection of the current estimate and the original projection information. Image 608 shows a sinogram of the error/difference in projection images. Time curves 610a-b are taken from the center vessel, wherein curve 610a represents the ground truth while curve 610b represents the current estimate. It can be observed that the error between the ground truth and estimate is very high.

In FIG. 2, at 210, refinement unit 107 invokes reconstruction unit 106 to perform a second 4D-DSA reconstruction based on the refined dataset to generate a zoomed-in 4D representation of the VOI. In some implementations, the second 4D-DSA reconstruction is performed within one or more boundaries of the refined projection dataset $p(t)_{VOI}$, effectively creating a zoomed-in 4D-DSA volume array $V(t)_{VOI}$.

Alternatively, the second 4D-DSA reconstruction is performed using the new refined dataset $V(t)_{spatial}$, resulting in a 4D representation of the VOI with a relatively increased spatial resolution of the vasculature in the VOI. The 4D representation can then be displayed with or without the vasculature outside the VOI.

In other implementations, the second 4D-DSA reconstruction is within one or more boundaries of the refined dataset $s(t)_{VOI}$, effectively creating a zoomed-in 4D-DSA volume array $V(t)_{VOI}$. With the limited amount of data to be reconstructed, an iterative reconstruction scheme can be used, thereby achieving superior accuracy performance when compared to conventional filtered backprojection reconstruction.

This 4D-DSA reconstruction step can be performed using any of the aforementioned reconstruction methods, such as those described in application Ser. No. 14/302,596 filed on Jun. 12, 2014 and German application no. 102015224176.9 filed on Dec. 3, 2015. With the limited amount of data to be reconstructed, an iterative reconstruction scheme can be used to achieve superior accuracy performance when compared to conventional filtered backprojection reconstruction. New 2D projection datasets may be reconstructed using the established methods.

Figure 7:
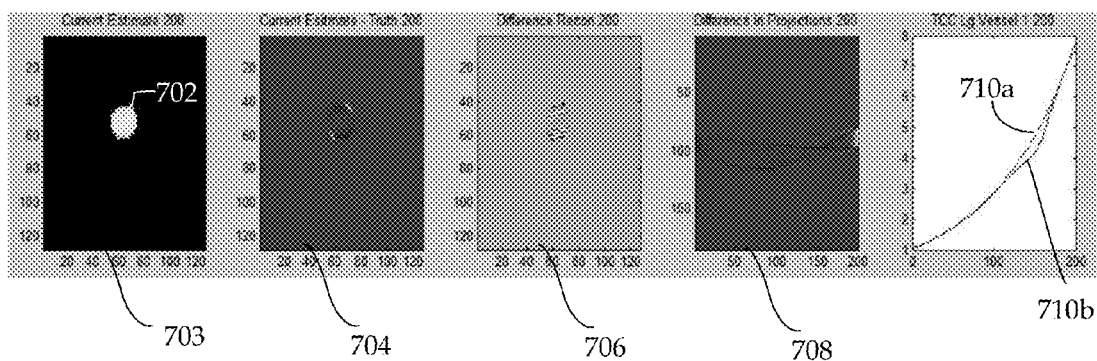
FIG. 7 illustrates a final estimate of the exemplary refined 4D-DSA reconstruction of a center vessel.

FIG. 7 illustrates a final estimate of the exemplary refined 4D-DSA reconstruction of the center vessel 702. The final estimate of the 4D-DSA reconstruction includes only the volume of interest. Image 703 shows the current 4D-DSA reconstruction of the center vessel 702. Image 704 shows the difference between the known ground truth and the current 4D-DSA reconstruction. Image 706 illustrates the reconstruction of the error between the projection of the current estimate and the original projection information. Image 708 depicts a sinogram of the error/difference in projection images. Time curves 710a-b are taken from the center vessel, wherein curve 710a represents the ground truth and curve 710b represents the estimate. It can be observed that the error between the ground truth and the final estimate is minimized.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A non-transitory computer-readable medium embodying instructions executable by machine to perform operations for data reconstruction comprising:
   performing a first four-dimensional reconstruction of time-varying data to generate a four-dimensional Digital Subtraction Angiography (DSA) dataset of an object of interest;
   identifying a volume of interest in the four-dimensional DSA dataset;
   extracting the volume of interest from the four-dimensional DSA dataset to generate a volume array;
   refining the volume of interest based on the volume array to generate a refined dataset; and
   performing a second four-dimensional reconstruction based on the refined dataset to generate a zoomed-in four-dimensional representation of the volume of interest.

2. The non-transitory computer-readable medium of claim 1 including further instructions executable by machine to refine the volume of interest by removing vascular data outside the volume of interest.

3. A system for data reconstruction, comprising:
   a non-transitory memory device for storing computer readable program code; and
   a processor in communication with the memory device, the processor being operative with the computer readable program code to:

perform a first four-dimensional reconstruction of time-varying data to generate a four-dimensional Digital Subtraction Angiography (DSA) dataset of an object of interest, identify a volume of interest in the four-dimensional DSA dataset, extract the volume of interest from the four-dimensional DSA dataset to generate a volume array, refine the volume of interest based on the volume array to generate a refined dataset, and perform a second four-dimensional reconstruction based on the refined dataset to generate a zoomed-in four-dimensional representation of the volume of interest.

4. The system of claim 3 further comprises an imaging device with a single rotating imaging plane that acquires the time-varying data.

5. The system of claim 3 further comprises an imaging device with multiple rotating imaging planes that acquire the time-varying data.

6. The system of claim 3 wherein the processor is operative with the computer readable program code to reconstruct a static three-dimensional image data of a device implanted in the object of interest.

7. The system of claim 3 wherein the processor is operative with the computer readable program code to identify the volume of interest by receiving a user selection of the volume interest via a user interface.

8. The system of claim 3 wherein the processor is operative with the computer readable program code to initiate a volumetric rendering of the four-dimensional DSA dataset at the user interface.

9. The system of claim 3 wherein the processor is operative with the computer readable program code to refine the volume of interest by removing vascular data outside the volume of interest.

10. The system of claim 9 wherein the processor is operative with the computer readable program code to remove the vascular data outside the volume of interest by
forward projecting the volume array into a corresponding projection image to generate an intermediate projection dataset, and
subtracting the intermediate projection dataset from the projection image to generate the refined dataset.

11. The system of claim 3 wherein the processor is operative with the computer readable program code to refine the volume of interest by changing spatial resolution settings within the volume array, outside the volume array or a combination thereof to generate the refined dataset.

12. The system of claim 3 wherein the processor is operative with the computer readable program code to refine the volume of interest based on filtered backprojection.

13. The system of claim 12 wherein the processor is operative with the computer readable program code to refine the volume of interest based on filtered backprojection by
removing the volume array from a static three-dimensional volume reconstructed by filtered backprojection to generate a cropped static volume array,
forward projecting the cropped static volume array into a corresponding projection image to generate an intermediate projection dataset, and
subtracting the intermediate projection dataset from the projection image to generate the refined dataset.

14. The system of claim 3 wherein the processor is operative with the computer readable program code to perform the second four-dimensional reconstruction within one or more boundaries of the refined dataset.

15. A method of data reconstruction, comprising:
performing a first four-dimensional reconstruction of time-varying data to generate a four-dimensional Digital Subtraction Angiography (DSA) dataset of an object of interest;
identifying a volume of interest in the four-dimensional DSA dataset;
extracting the volume of interest from the four-dimensional DSA dataset to generate a volume array;
refining the volume of interest based on the volume array to generate a refined dataset; and
performing a second four-dimensional reconstruction based on the refined dataset to generate a zoomed-in four-dimensional representation of the volume of interest.

16. The method of claim 15 wherein refining the volume of interest comprises removing vascular data outside the volume of interest.

17. The method of claim 15 wherein refining the volume of interest comprises changing spatial resolution settings within the volume array, outside the volume array or a combination thereof to generate the refined dataset.

18. The method of claim 15 wherein refining the volume of interest comprises refining the volume of interest based on filtered backprojection.

19. The method of claim 18 wherein refining the volume of interest based on filtered backprojection comprises
removing the volume array from a static three-dimensional volume reconstructed by filtered backprojection to generate a cropped static volume array,
forward projecting the cropped static volume array into a corresponding projection image to generate an intermediate projection dataset, and
subtracting the intermediate projection dataset from the projection image to generate the refined dataset.

20. The method of claim 15 wherein the second four-dimensional reconstruction is performed within one or more boundaries of the refined dataset.

* * * * *